Oct. 9, 1928.

L. H. MILLER 1,686,872

LUBRICATOR

Filed Nov. 15, 1926  3 Sheets-Sheet 1

Witnesses:

Inventor:
LEWIS H. MILLER,
by D. Anthony Usina
his Attorney.

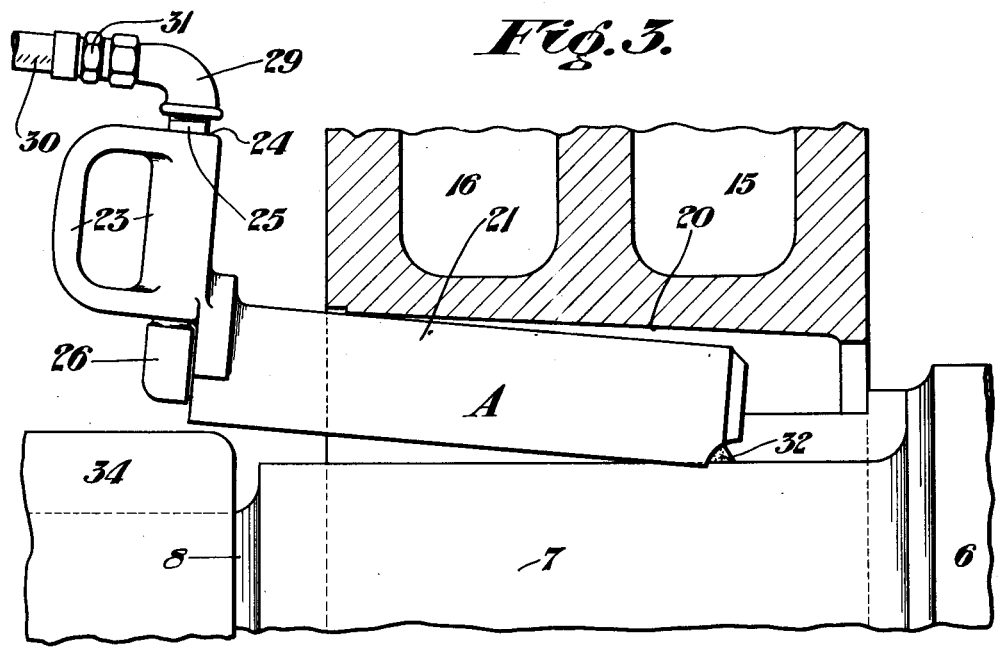
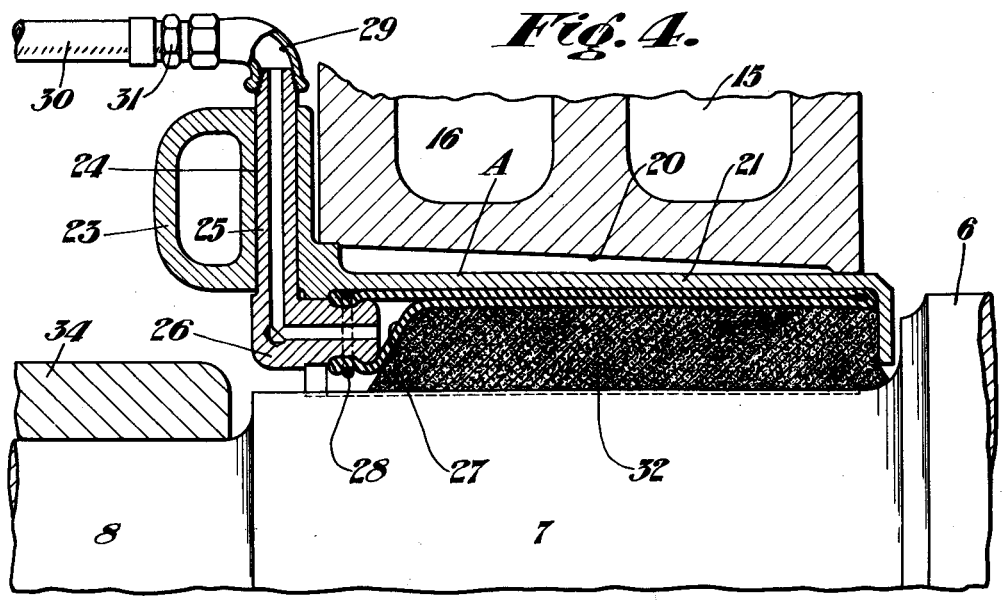

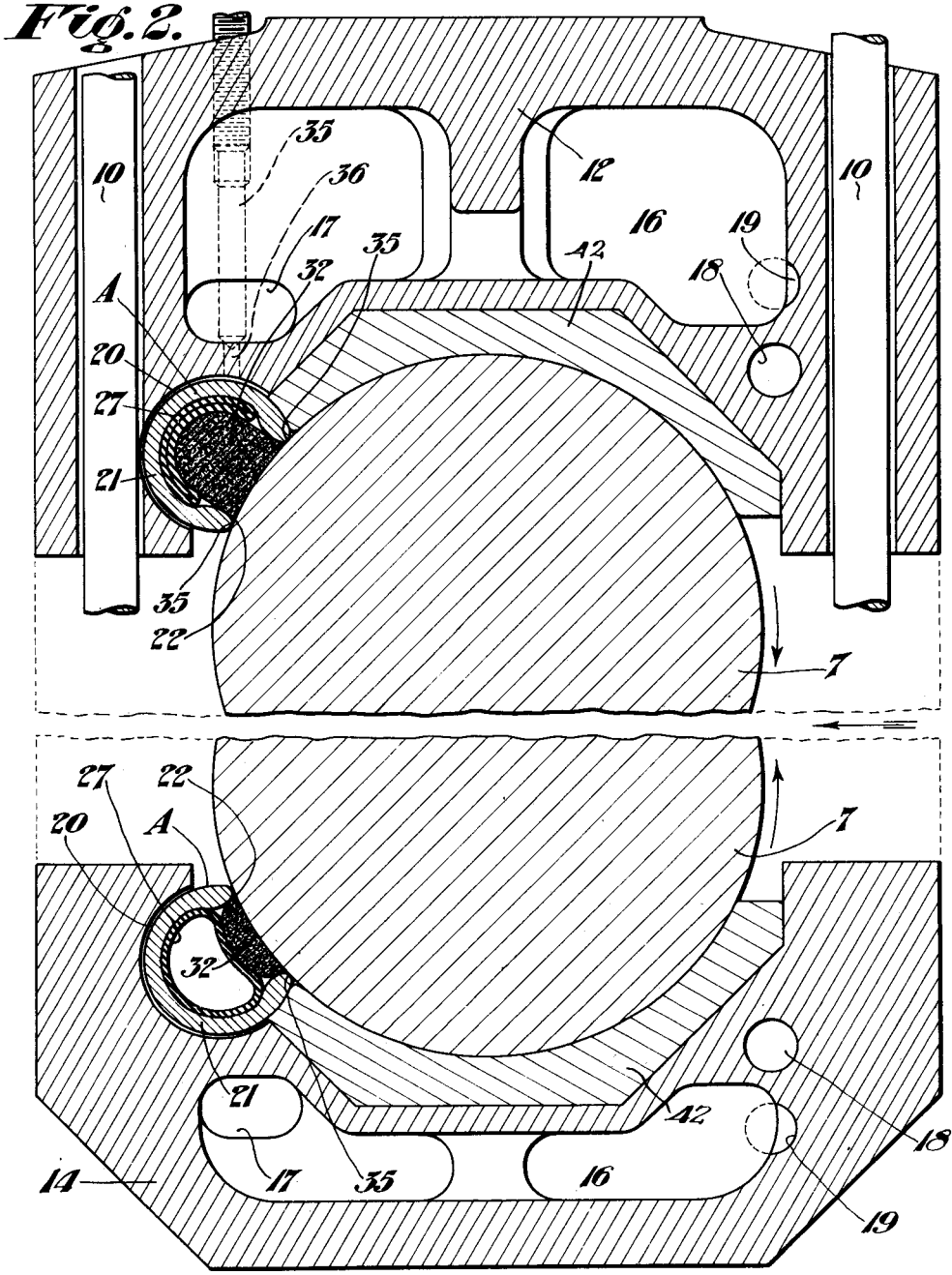

Patented Oct. 9, 1928.

1,686,872

UNITED STATES PATENT OFFICE.

LEWIS H. MILLER, OF CLEVELAND, OHIO.

LUBRICATOR.

Application filed November 15, 1926. Serial No. 148,494.

This invention relates to lubricators and more particularly to lubricators for high pressure bearings, such as partial roll bearings used in rolling mills where a heavy substance is employed as a lubricant.

One object of the present invention is to provide a novel form of lubricator which will positively and continuously force heavy lubricant onto the bearing surfaces and to reduce foreign matter, such as dust and particles of scale, from working between the bearing surfaces, whereby friction loss and power will be materially reduced and the life of the bearing metals prolonged.

When this invention is used to lubricate the roll necks of a cold rolling stand, the above will be effected, chatter marks will be substantially eliminated, waste of lubricant will be greatly reduced and a cleaner mill can be maintained.

In the drawings:

Figure 2 is a sectional elevation through the journals and bearings of the roll stand showing the lubricators in position, the upper lubricator being collapsed and the lower expanded.

Figure 3 is a fragmentary sectional view of the upper bearing of the stand taken at right angles to Figure 2, showing the lubricator being positioned in the bearing.

Figure 4 is a similar view showing the lubricator sectioned and in operative position.

Figure 1:
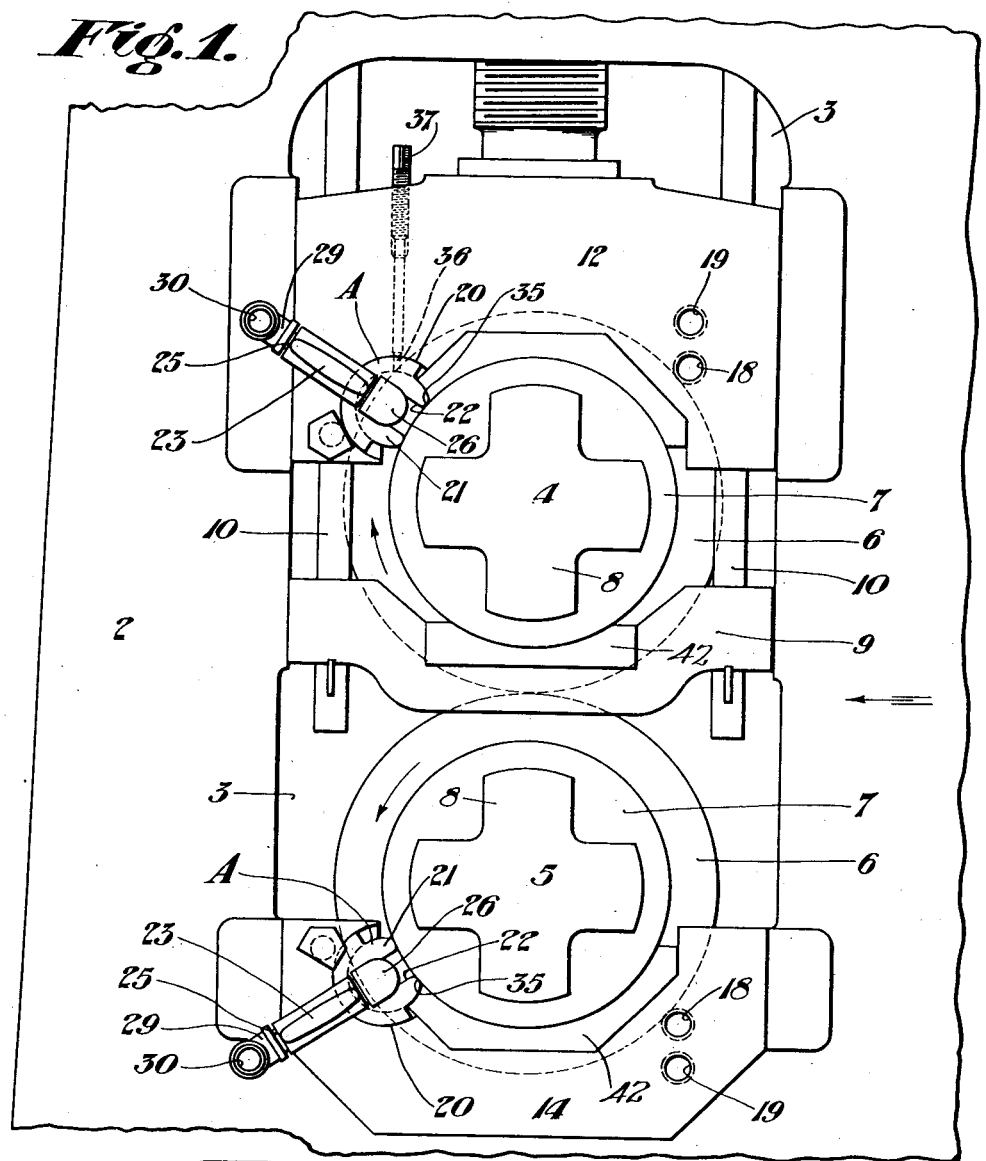
Figure 1 is a side elevation showing a stand of rolls having this invention applied thereto.

Referring more particularly to the drawings, the numeral 2 designates a roll housing of standard design having the usual window 3 therein in which the roll bearings are mounted.

Rolls 4 and 5 of standard design, composed of body portions 6, journal or neck portions 7 and wobbler ends 8, are journaled in suitable bearings in the window 3.

The upper roll 4 has its neck portion supported on a roll carrier 9, suspended from the housing by rods 10, and bears against a top bearing 12, while the lower roll has its neck portion bearing against a bottom bearing 14.

The bearings 12 and 14 are of the usual or standard design, and are provided with cooling water chambers 15 and 16 connected by a passage 17, and are provided with an inlet passage or conduit 18 communicating with the chamber 15, and an outlet passage or conduit 19 communicating with the chamber 16 so as to provide for a circulation of cooling water through the bearings.

The bearing blocks 12 and 14 are provided with bearing faces of bearing metals, such as bronze or babbitt or both, either integral with the bearing blocks 12 and 14 or separate in the form of liners 42 as shown.

The bearings 12 and 14 are each recessed longitudinally, as at 20, to receive the lubricators A. The center of bearing pressure for the roll journals or neck 7 lies near an extended line drawn through the roll centers and between this line and the in-rolling side of the journal. The recesses 20, to receive the lubricators A, are located between this center of pressure and the in-rolling side of the roll necks, so as to apply the lubricant at the most advantageous point.

The lubricators A comprise a hollow pod or body 21, preferably formed from metal and having one longitudinal side 22 open. The body portions 21 of the lubricators A are positioned in the recesses 21 so that their open sides 22 are toward the roll necks. The outer end of the body portion 21 is provided with an upstanding handle portion 23, and a vertical opening 24 is provided in the handle to receive a conduit 25 having an elbow head portion 26 at its lower end which extends into the hollow body 21.

A hollow flexible pouch 27, preferably formed of rubber or the like, is mounted in the body 21 of the lubricator and extends substantially the entire length thereof.

The pouch 27 has one open end which is fitted over the head 26 of the conduit 25 and secured in position by a spring clamp 28. The conduit 25 has its upper end provided with an elbow 29 to which a hose or other conduit 30, leading from a source of fluid under pressure, is connected by a coupling 31.

The body 21 is adapted to be filled with a body of lubricating material 32 on top of the pouch 27, so that when the pouch is expanded the lubricant will be forced out against the roll necks. The pod or body 21 may be filled with any standard heavy lubricant, such as commercial grease, suet, graphite, soapstone, or a combination of the above as desired.

The wobbler ends 8 of the rolls are adapted to be connected by wobblers 34 to suitable driving mechanism. The wobblers 34 are of considerable size and generally project beyond the roll necks 7, so that the lubricators can not be passed horizontally into the recesses 20 in the bearings, but must be inclined to clear the wobblers. Therefore, the recesses 20 are slightly flared upwardly at their outer ends to permit the lubricators to clear the wobblers 34, as shown in Figure 3. The longitudinal edges of the body or pod 21 are rounded, as at 35, to prevent shearing or destruction of the lubricant film applied to the roll necks.

In operation, the lubricators A are assembled, filled with the lubricant 32 and positioned in the recesses 20. Fluid under constant pressure is then permitted to enter the pouch 27 and inflate or expand the pouch, thus exerting a constant pressure on the lubricant and forcing it out against the roll necks so that they are thoroughly lubricated over their entire length.

If desired, an opening 36 may be provided in the bearings communicating with the cooling water chamber 15 and controlled by a needle valve 37 to permit a flow of water from the bearing to the surface of the lubricator for cooling or to the lubricant for adhesion, as shown in the upper bearing of Figure 2.

Figure 5:
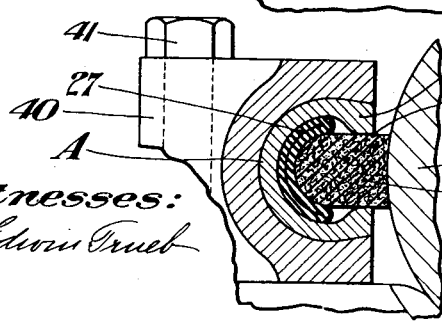
Figure 5 is a fragmentary detail view illustrating a modified form of lubricator holder adapted to be bolted to the roll bearings.

In Figure 5 I have shown a modification in which a pod or lubricator body holder 40, secured to the face of a bearing by a bolt 41, and having one of the lubricators A positioned therein. By using the holder 40 no change is made in the standard bearings 12 or 14, except to provide a tapped hole for the bolt 41.

While I have shown and described certain specific embodiments of my invention, it will be understood that I do not wish to be limited thereto since various modifications may be made without departing from the scope of my invention as defined in the appended claims.

I claim:

1. The combination with a bearing and a roll having its neck portion journaled in said bearing, said bearing having water cooling passages therein, said passages being connected to a source of water supply, of a lubricator comprising a hollow body portion having one open side, said body portion being mounted adjacent said roll neck with its open side toward said roll neck, said body being adapted to be filled with a quantity of lubricant, fluid pressure operated means for forcing said lubricant out of said body and against said roll neck, and means for permitting a flow of water from said bearings onto said lubricator for cooling said lubricator and causing adhesion of the lubricant.

2. A lubricator for lubricating roll necks, journals and other bearing surfaces, comprising a hollow rigid body portion having one open side and adapted to be filled with a quantity of lubricant, said body being adapted to be mounted adjacent the bearing surface to be lubricated and with its open side toward said surface, and a normally collapsed, resilient, flexible fluid-tight pouch mounted between said body and said lubricant and adapted to be expanded by the admission of fluid under pressure to force said lubricant out of said body under constant pressure against the surface to be lubricated.

3. The combination with a bearing and a roll having its neck portion journaled in said bearing, of a lubricator comprising a hollow rigid one-piece body portion having one open side, said body portion being mounted adjacent said roll neck with its open side toward said roll neck, said body being adapted to be filled with a quantity of lubricant, and a normally collapsed flexible fluid-tight one-piece pouch mounted between said body and said lubricant and adapted to be expanded by the admission of fluid under pressure to force said lubricant out of said body and against the surface of said roll neck.

4. The combination with a bearing and a roll having its neck portion journaled in said bearing, said bearing having a recess formed longitudinally therein, of a lubricator, said lubricator comprising a hollow rigid one-piece body portion having one open side, said body portion being mounted adjacent said roll neck with its open side toward said roll neck, said body being adapted to be filled with a quantity of lubricant, and a normally collapsed flexible fluid-tight one-piece pouch mounted between said body and said lubricant and adapted to be expanded by the admission of fluid under pressure to force said lubricant out of said body and against the surface of said roll neck.

In testimony whereof, I have hereunto signed my name.

LEWIS H. MILLER.